United States Patent [19]

Bommart

[11] 3,813,502
[45] May 28, 1974

[54] CONDUCTOR RAILS FOR ENERGISING ELECTRICAL MACHINERY

[75] Inventor: Patrick Theodore Bommart, Rueil Malmaison, France

[73] Assignee: Acieries De Gennevilliers Anciens Establissements C. Deleachaux, Gennevilliers, France

[22] Filed: Oct. 10, 1972

[21] Appl. No.: 296,378

[30] Foreign Application Priority Data
Oct. 8, 1971   France .............................. 71.36256

[52] U.S. Cl. ............... 191/30, 191/29 DM, 191/39
[51] Int. Cl. .............................................. B60m 1/34
[58] Field of Search ......... 191/22 R, 22 DM, 29 R, 191/29 DM, 30, 39

[56] References Cited
UNITED STATES PATENTS
1,544,263   6/1925   Montgomery .......................... 191/29

3,582,575   6/1971   Scofield .......................... 191/29 DM
3,602,655   8/1971   Scofield .......................... 191/29 DM
3,730,310   5/1973   Springer ........................... 191/29 DM Primary Examiner—Lloyd L. King
Assistant Examiner—D. W. Keen
Attorney, Agent, or Firm—Breitenfeld & Levine

[57] ABSTRACT

A conductor rail assembly for high speed tracked vehicles includes an I-section aluminium rail core, the lower flange carrying a U-section stainless steel sheath for contact by a current-collecting shoe. The remainder of the core is protected by an insulating sheath which is spaced from the vertical web of the core to provide spaces within which fishplates can be located. An inverted J insulating support carries the rail by means of a resilient claw. The base of the support is connected to a bracket secured to track sleepers, the connection between support and bracket enabling vertical and lateral adjustment.

8 Claims, 10 Drawing Figures

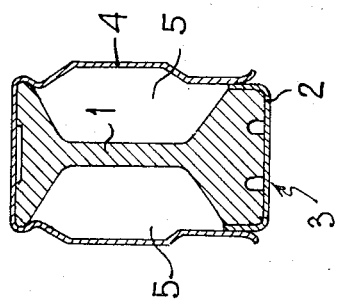
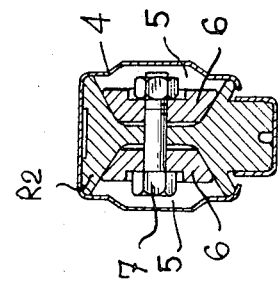
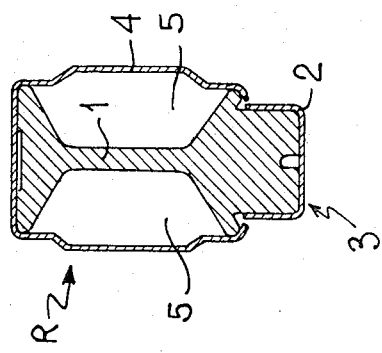
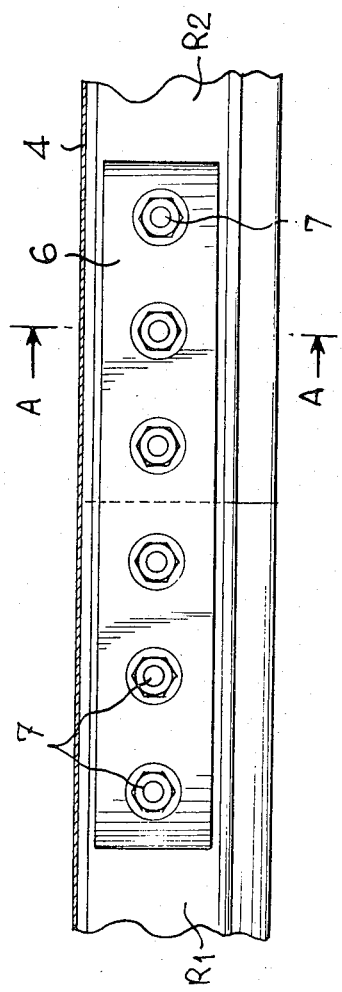

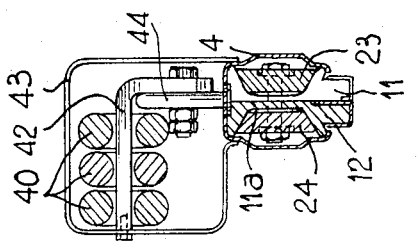
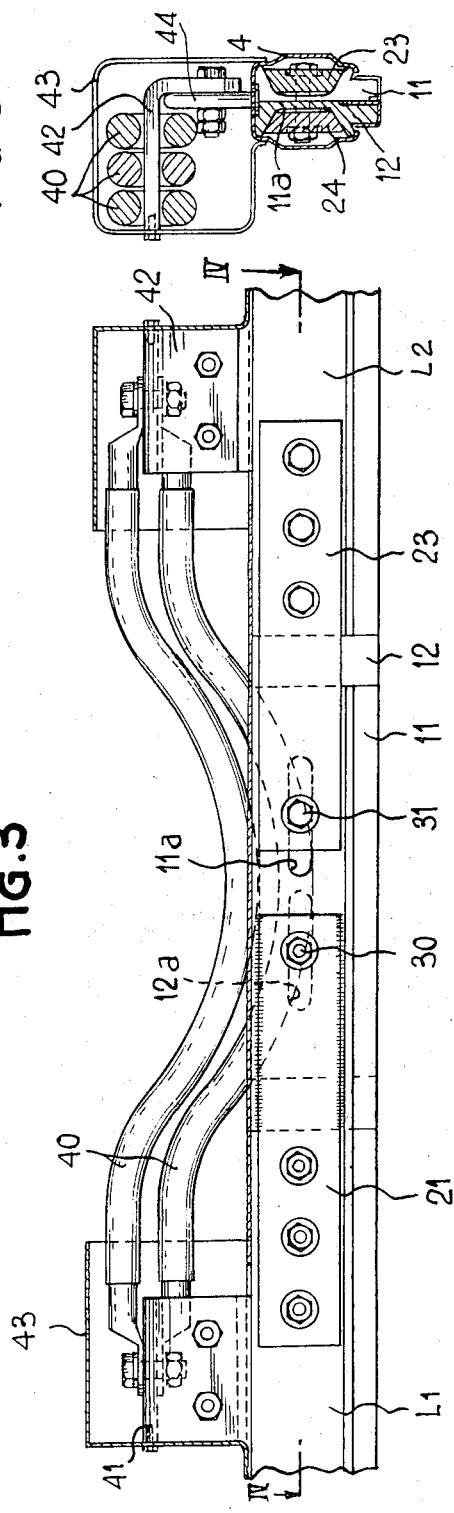
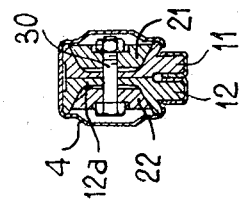
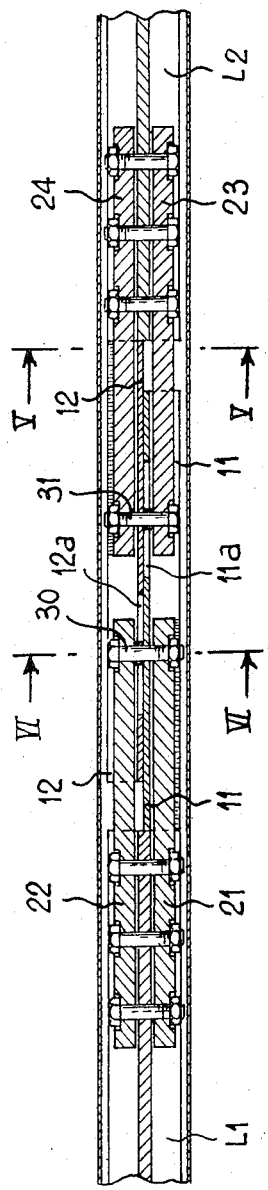

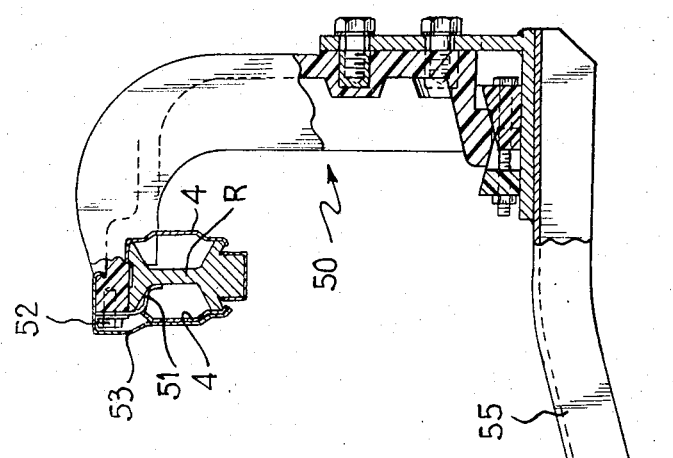
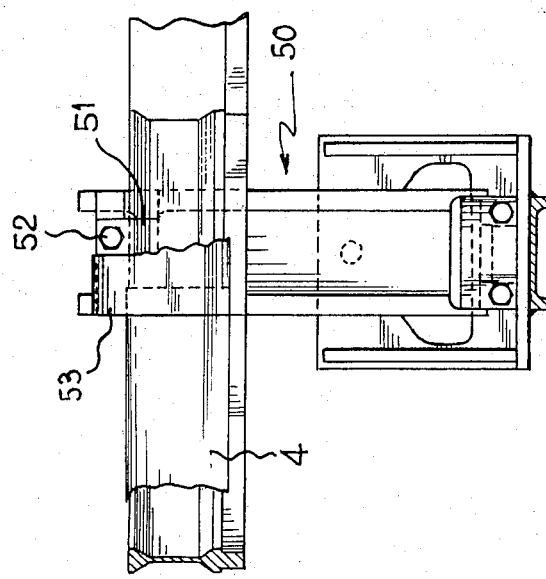

CONDUCTOR RAILS FOR ENERGISING ELECTRICAL MACHINERY

This invention relates to conductor rails for energising electrical machinery such as very high-speed tracked electric motor driven vehicles. The invention is also concerned with methods of supporting such rails on an insulator and the provision of novel forms of joints between ends of two adjacent lengths of rail.

Whilst it has been proposed to manufacture a conductor rail by utilising an I-section aluminium core having a U-section stainless steel sheath or a jacket or the like at one end to be contacted by a current-collecting shoe, problems arise in connection with the insulation and support of the rail.

Accordingly one object of the present invention is to provide a novel conductor rail construction which simplifies current collection and reduces the risk of poor contact due to dirt and icing up.

Other objects include the provision of a method of rail support, and insulated connections between rail lengths.

According to one aspect of the present invention a conductor rail comprises a longitudinal core having a pair of flanges opposed central regions of which are interconnected by a web to form a substantially I-section construction, a longitudinal, generally U-section conducting sheath being disposed over one flange for engagement by a current-collecting shoe, a longitudinal, generally U-section electrically insulating sheath having a base portion covering an outwardly facing surface of the second flange, lateral portions of the insulating sheath extending to adjacent the said one flange but being separated from the web to define a space on each side thereof.

In a preferred system employing a rail of this type, the conducting sheath preferably faces downwards and is adapted to cooperate with a flat shoe or the like which is biassed upwards so as to rub on the under surface of the sheath. In this case it is not always necessary to guide the shoe on the rail which can simplify current collection.

The said one flange may have a lateral protuberance on each side and the insulating sheath may engage around each protuberance. Alternatively, the insulating sheath may overlap the conducting sheath on each side.

A further object of the present invention comprises the novel interconnection of adjacent ends of a pair of rails of the above type. This may be carried out for example, where the rails butt end to end, by fishplates situated one in each of the spaces on the sides of the web in order to be insulated from the exterior.

In an alternative arrangement, adjacent ends of the two rails are each reduced in cross section along a vertical plane extending through the web and overlap one another to form an expansion joint, the overlapping portions being interconnected by fishplates disposed within the said spaces.

The invention also relates to a novel assembly of a conductor rail to an insulating support and to methods of adjusting the bottom of such a support. Thus such an assembly may comprise an insulating support e.g., of inverted J-form having an overhanging portion to which is secured a conductor rail which comprises a longitudinal core having a pair of flanges opposed central regions of which are interconnected by a web to form a substantially I-section construction, a longitudinal generally U-section conducting sheath being disposed over one flange, for engagement by a collecting shoe, the rail being secured to the support by a resilient element connected to the support and engaging under the second flange of the core, the second flange, except in the region of the connection of the resilient element to the support, being covered by an electrically insulating sheath having lateral portions thereof extending to adjacent the first flange but being separated from the web to define a space on each side thereof, and a further insulating element being positioned over a portion of the support, the resilient element, and an adjacent portion of the core in the region of the said connection.

The invention may be carried into practice in a number of ways but certain specific embodiments will now be described by way of example with reference to the accompanying drawings, in which:

FIG. 1 is a transverse cross section of a conductor rail and its insulating sheath according to the present invention;

FIG. 1a is a transverse cross section of an alternative embodiment;

FIG. 2 is a sectional side elevation of the abutting ends of two rails;

FIG. 2a is a transverse cross section on the line A—A of FIG. 2;

FIG. 3 is a side elevation of an expansion joint between two rails;

FIG. 4 is a sectional plan on the line IV—IV of FIG. 3;

FIGS. 5 and 6 are transverse cross sections on the lines V—V and VI—VI respectively of FIG. 4;

FIG. 7 is a sectional elevation with part broken away illustrating the manner in which a conductor rail is secured to an insulating support; and FIG. 8 is a sectional view, from the side, of the structure shown in FIG. 7.

FIG. 1 illustrates one form of conductor rail according to the invention which includes an I-shaped drawn or extruded aluminium core the lower flange of which is surrounded by a longitudinal U-shaped sheath or jacket 2 formed of stainless steel which may be secured to the core 1 for example by crimping. Alternatively the jacket may be secured to the core 1 by means of fused joints which are welded to the aluminium of the core and which extend through apertures in the wall of the jacket or sheath 2. The lower surface 3 of the sheath is substantially horizontal and has a smooth outside surface and in practice is the area over which a current-collecting shoe of a vehicle rubs. Above the sheath or jacket 2 the remainder of the core 1 is surrounded by an inverted U-shaped protective insulating sheath 4 which extends in spaced relationship to the centre vertical web of the core in order to leave spaces 5 on either side of this web for a purpose to be described. The sheath 4 may for example be manufactured from P.V.C. or similar plastics material, and the lower ends of the sides thereof engage slight lateral protuberances of the lower flange of the core 1.

In practice, in order to allow for differences in coefficients of expansion between the aluminium of the core and the stainless steel of the sheath 2, a single length of aluminium core 1 preferably has associated with it a number of sheath elements 2 extending end to end along the length of the rail.

FIG. 1a, which utilizes the same reference numerals as the embodiment of FIG. 1, illustrates a constructional variant in which the lower flange of the core 1 is of slightly different shape and the protective sheath 4 extends downwardly and overlaps the side faces of the stainless steel jacket 2.

Referring now to FIGS. 2 and 2a, a description follows of the manner in which two adjacent rails are connected end to end. This connection comprises a butt connection between the opposing ends of rails R1 and R2. The rails are secured together by trapezoidal cross section fishplates 6 the sides surfaces of which are applied to the inside surfaces of the upper and lower flanges of the core 1 of each of the rails with transverse bolts 7 extending through the fishplates and the rails to enable a tight connection to be made. By virtue of the shape of the protective sheath 4 the fishplates and the bolts are entirely received within the spaces 5 and therefore are fully covered and protected by the sheath. Although the sheath 4 will be formed in a number of sections these may in practice be much longer than any particular length of rail and therefore any joints between the sections of sheaths need not necessarily occur at the position of joints between two adjacent ends of two rails.

Referring now to FIGS. 3 to 6, these show a form of expansion joint between two rail lengths L1 and L2. In order to allow the joint shown in these Figures to take up variations in rail length due to changes in ambient temperature, the adjacent ends 11 and 12 respectively of the rails L1 and L2 are machined away along opposite sides of vertical median planes of the webs in order to allow the remaining half rail sections to overlap one another as shown in FIGS. 4, 5 and 6. The lower flange of each half rail section is surrounded by its own individual U-shaped stainless steel jacket as shown in FIGS. 5 and 6, the adjacent sides of these two, so-called half jackets, abutting one another in a longitudinal slot formed between the two abutting half sections of rail, see FIG. 6.

The remainder of the vertical webs of the rails in the region of the overlapping joint are provided with horizontal oblong slots 11a 12a respectively. As with the previous embodiment the rails are secured together by fishplates 21, 22, 23 and 24 which are secured to the respective rails L1 and L2 by means of three transverse bolts in each case as shown in FIGS. 3 and 4 and also by a further transverse bolt 30 or 31, respectively, which extend through the slots 12a and 11a, respectively.

On one side of each expansion joint the fishplates 21 to 24 serve as a guide for the half rails 11 and 12, the half rail 11 being associated with the projecting part of the fishplate 21 by welding and the half rail 12 being associated with the projecting part of the fishplate 23 by welding. In this way mechanical continuity is provided between the two lengths of rail L1 and L2 and there is provision for changes in their lengths due to temperature. At the same time continuity of shoe contact can be provided over at least half of the rail width by means of the so-called half jackets of stainless steel.

The complete expansion joint is, as shown in FIG. 6, completely enveloped by the protective insulating sheath 4. Referring to FIGS. 3 and 5 electrical connection between the rails L1 and L2 is provided by cables 40 secured to a pair of terminals 41 and 42 respectively connected to the rails L1 and L2. The terminals are covered by insulating protectors 43. The terminals 41 and 42 can either be welded to the respective rails or connected by bolts to vertical webs 44 which are themselves secured by welding to the rails, for example as shown in FIG. 5. The terminals may project from either side of the rail, as required.

FIGS. 7 and 8 illustrate an embodiment of an insulator support for a conductor rail according to the invention. The rail R may be of the form shown for example in FIG. 1 and this is secured to an insulator 50 manufactured for example from a polyester material and resembling an inverted J. The rail may be secured to the top of the insulator by means of a resilient hooked claw 51 secured by bolts 52 to the insulator. The lower, free, end of the claw 51 engages the underside of one side of the upper flange of the core and in this way, whilst the rail is rigidly locked against lateral or vertical movement, the rail can move longitudinally with respect to the insulator, for example during expansion or contraction.

The insulating sheath 4 will necessarily have to be interrupted in the region of the connection between the insulator and the rail, but an insulating hood or cover member 53 can be provided on top of the claw 51. Thus, as shown in FIG. 8, the hood 53 is generally of L-section having a horizontal arm bearing on the top of the insulator and a generally vertical arm contacting one side surface of the insulating sheath 4.

Referring to FIG. 8, the lower end of the support 50, according to another feature of the invention, is secured to a bracket 55 which can be rigidly secured to track sleepers, the connection between the support 50 and the bracket 55 being such as to enable vertical and horizontal adjustment to permit alignment of the rail to ensure correct contact between the rail and the current-collecting shoe of vehicles.

To summarise, the invention provides an arrangement in which the conductor rail can be insulated, except at its current-collecting region, along its whole length.

The embodiments described and shown are illustrative only and are not to be taken in a limiting sense. The present invention includes all equivalent variations of these embodiments and is limited only by the scope of the claims.

What I claim as my invention and desire to secure by letters patent is:

1. A conductor rail comprising a longitudinal core having a pair of flanges opposed central regions of which are interconnected by a web to form a substantially I-section construction, a longitudinal generally U-section conducting sheath being disposed over one flange for engagement by a collecting shoe, a longitudinal generally U-section electrically insulating sheath having a base portion covering an outwardly facing surface of the second flange, lateral portions of the insulating sheath extending to adjacent the said one flange but being separated from the web to define a space on each side thereof, said lateral portions of said insulating sheath having edges cooperating with said one flange to close said spaces.

2. A conductor rail as claimed in claim 1 in which the said one flange has a lateral protuberance on each side and the insulating sheath engages around each protuberance.

3. A conductor rail as claimed in claim 1 in which the insulating sheath overlaps the conducting sheath on each side.

4. A conductor rail as claimed in claim 1 in which the core is formed of aluminium and the conducting sheath is formed of stainless steel.

5. A conductor rail assembly comprising a pair of rails each substantially of the form as claimed in claim 1 and having adjacent ends thereof interconnected by at least two fishplates situated one within each space.

6. An assembly as claimed in claim 5 wherein the adjacent ends of the two rails are each reduced in cross section along a plane extending through the web and overlap one another to form an expansion joint, the overlapping portions being interconnected by fishplates disposed within the said spaces.

7. A conductor rail comprising a longitudinal core having a pair of flanges opposed central regions of which are interconnected by a web to form a substantially I-section construction, a longitudinal generally U-section conducting sheath being disposed over one flange for engagement by a collecting shoe, a longitudinal generally U-section electrically insulating sheath having a base portion covering an outwardly facing surface of the second flange, lateral portions of the insulating sheath extending to adjacent the said one flange but being separated from the web to define a space one each side thereof, the said one flange having a lateral protuberance on each side and the insulating sheath engaging around each protuberance.

8. A conductor rail comprising a pair of rails, each rail comprising a longitudinal core having a pair of flanges opposed central regions of which are interconnected by a web to form a substantially I-section construction, a longitudinal generally U-section conducting sheath being disposed over one flange for engagement by a collecting shoe, a longitudinal generally U-section electrically insulating sheath having a base portion covering an outwardly facing surface of the second flange, lateral portions of the insulating sheath extending to adjacent the said one flange but being separated from the web to define a space on each side thereof, said rails being arranged end-to-end, the adjacent ends of the two rails each being reduced in cross section along a plane extending through the web and overlapping each other to form an expansion joint, the overlapping portions being interconnected by fishplates disposed within the said spaces.

* * * * *